Feb. 1, 1927.
V. P. WILLIAMS
1,615,861
COMBINED MECHANICAL AND FLUID PRESSURE VEHICLE PARKING DEVICE
Filed Feb. 6, 1926     11 Sheets-Sheet 1
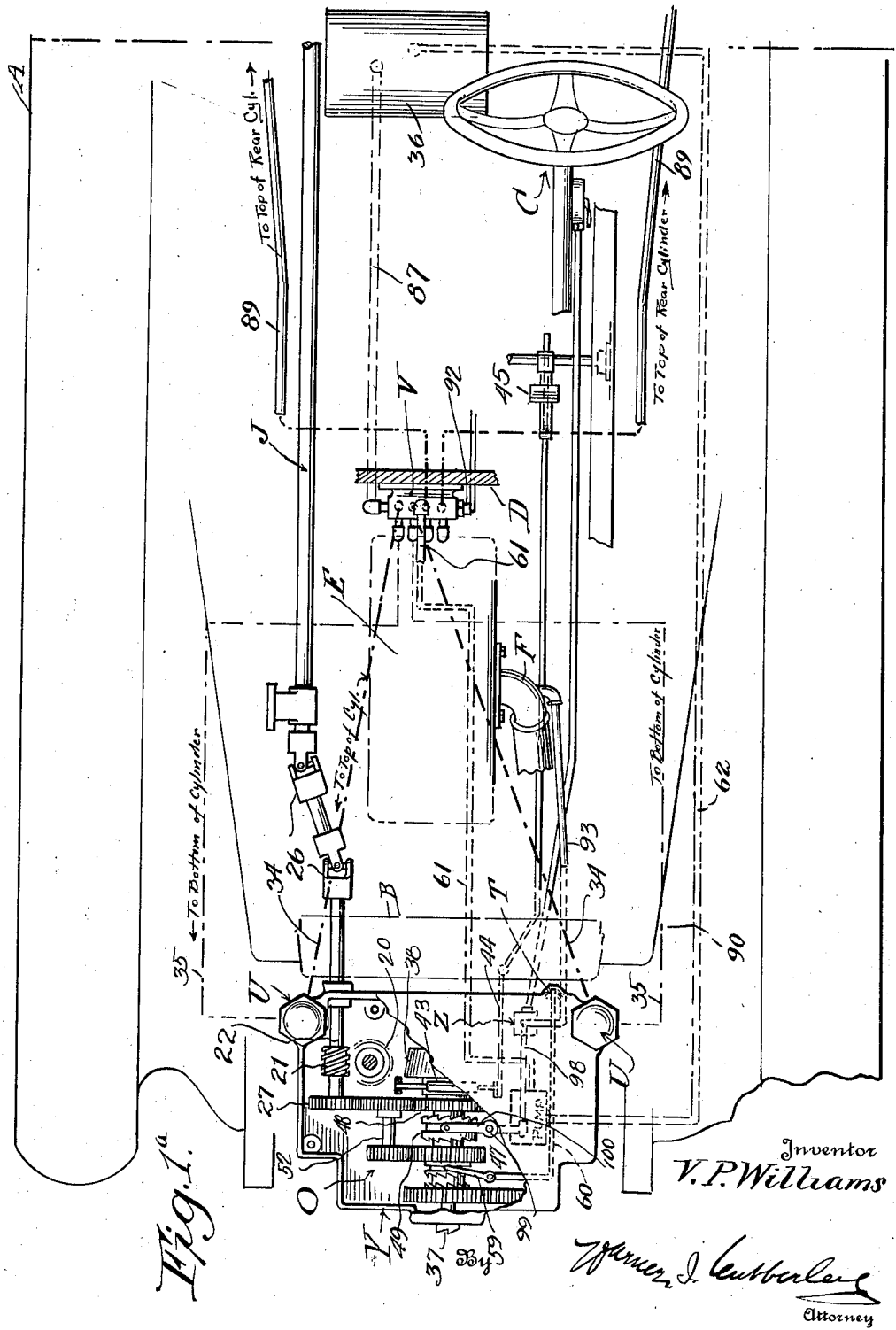

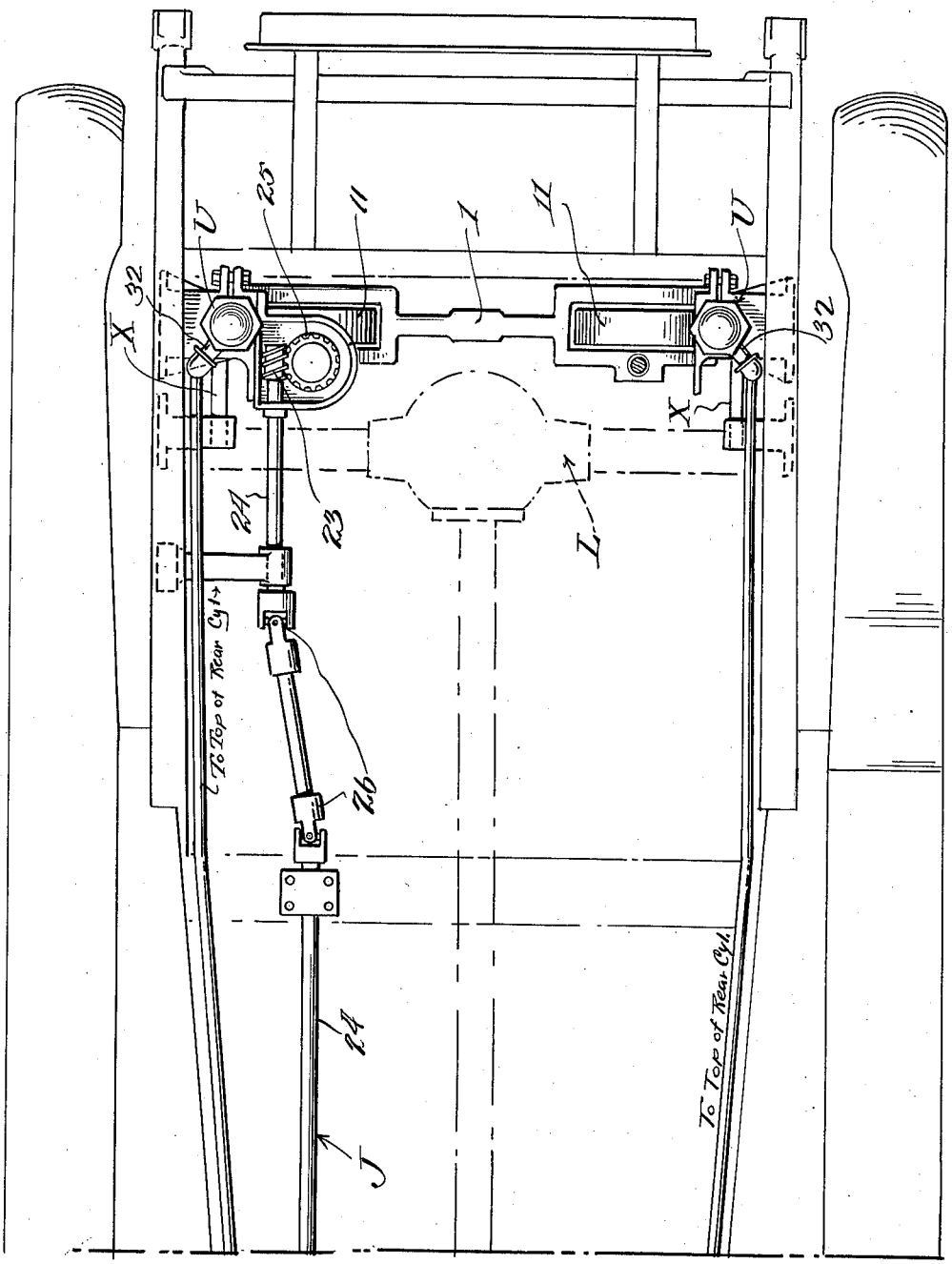

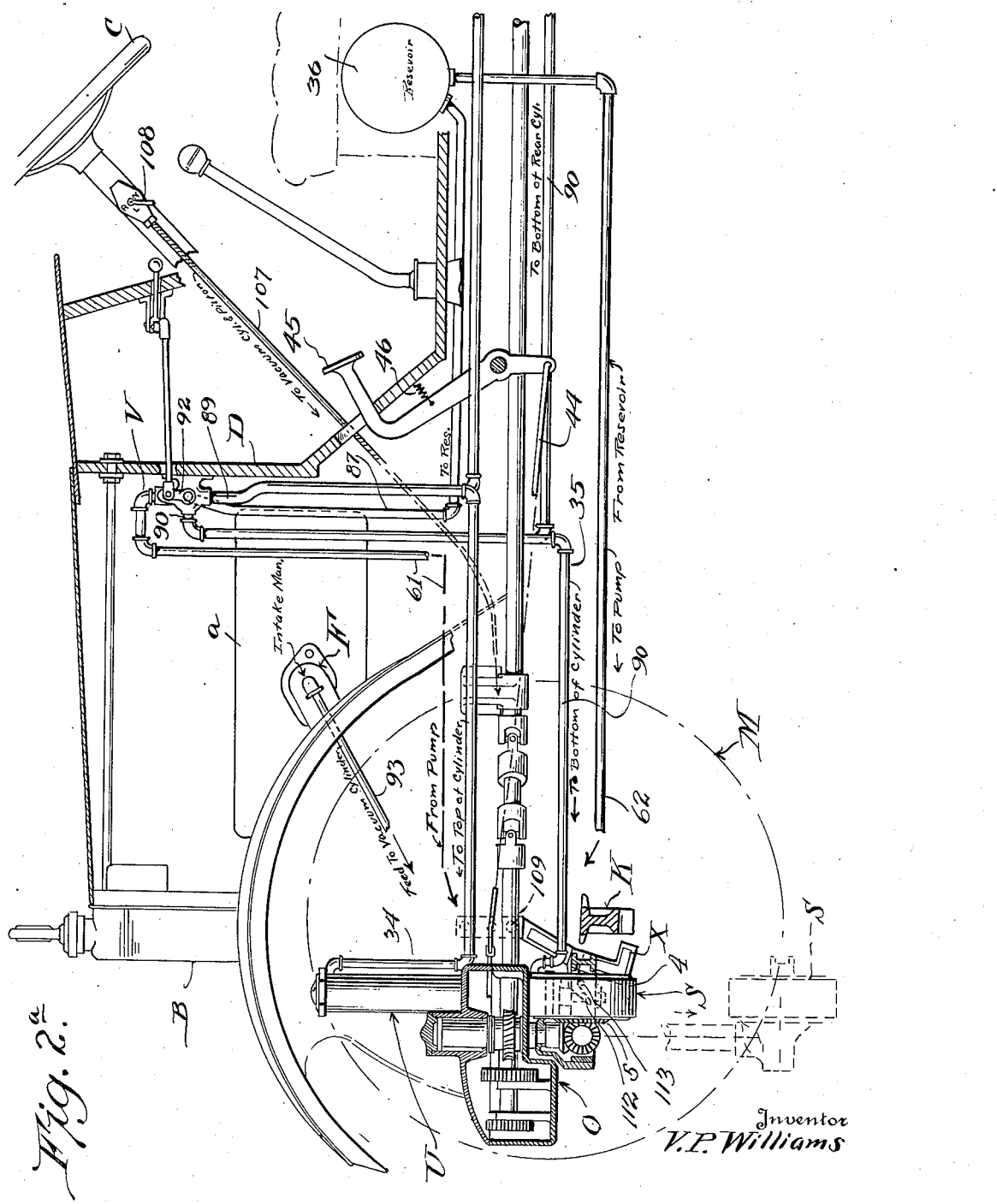

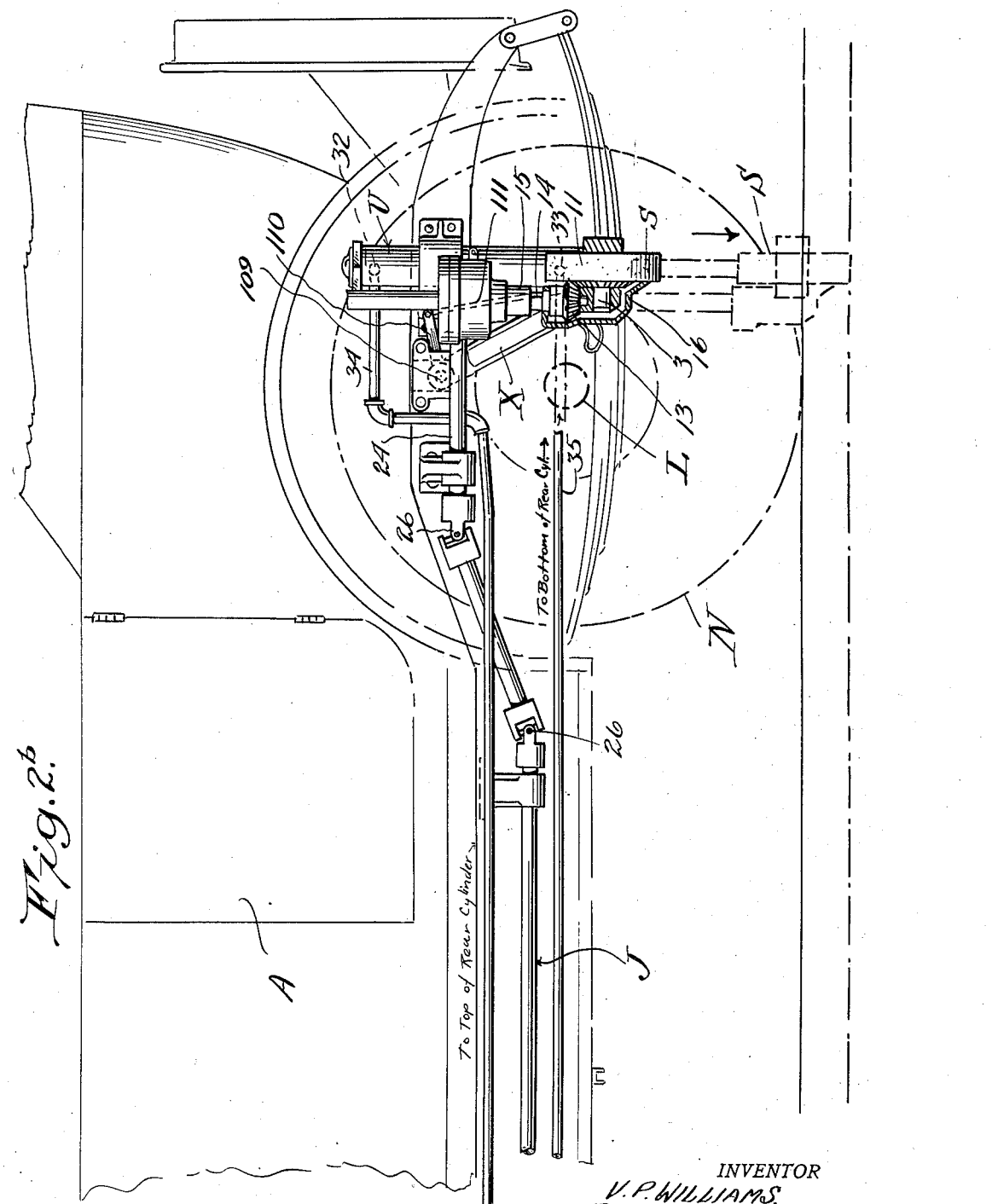

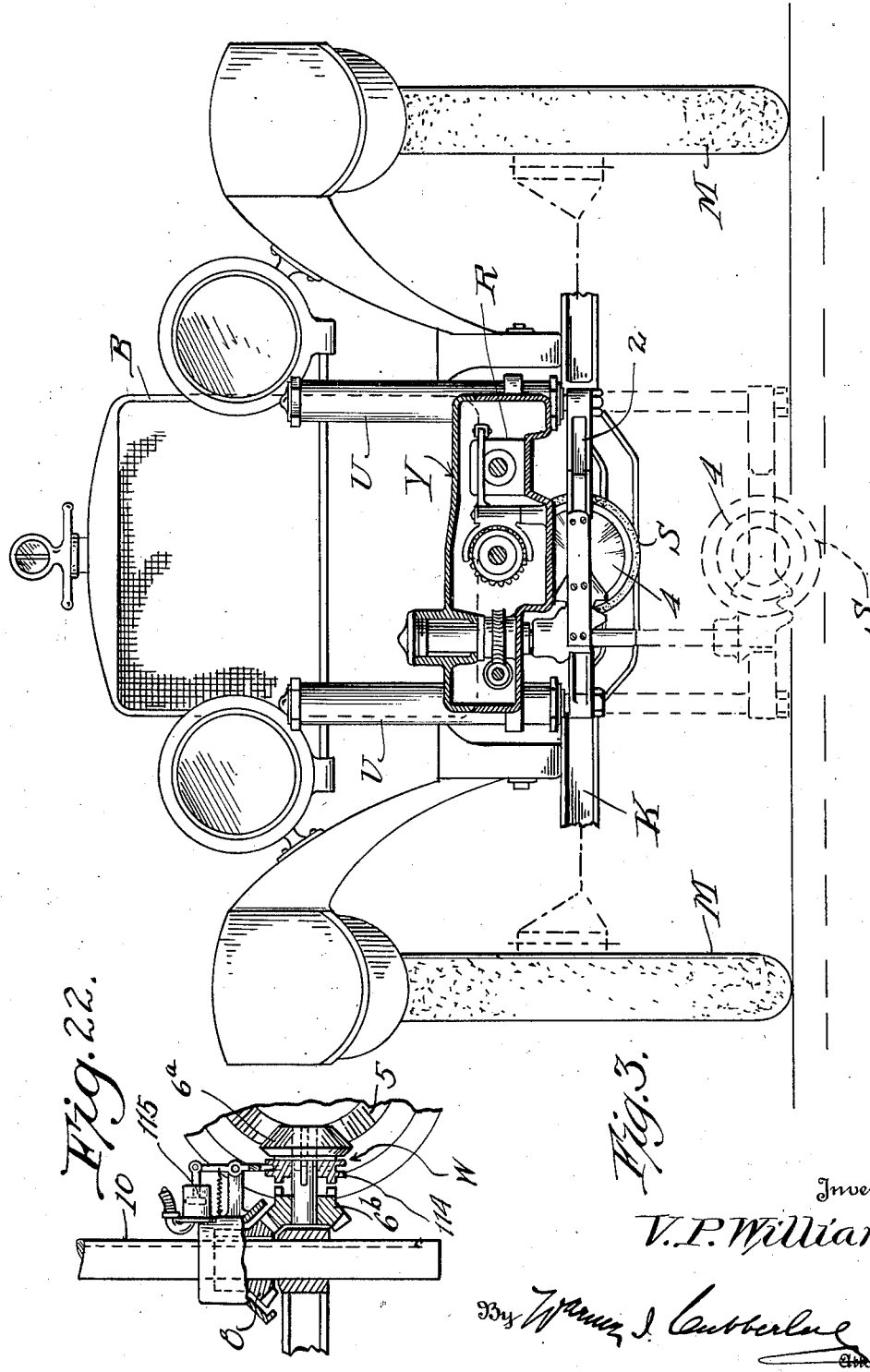

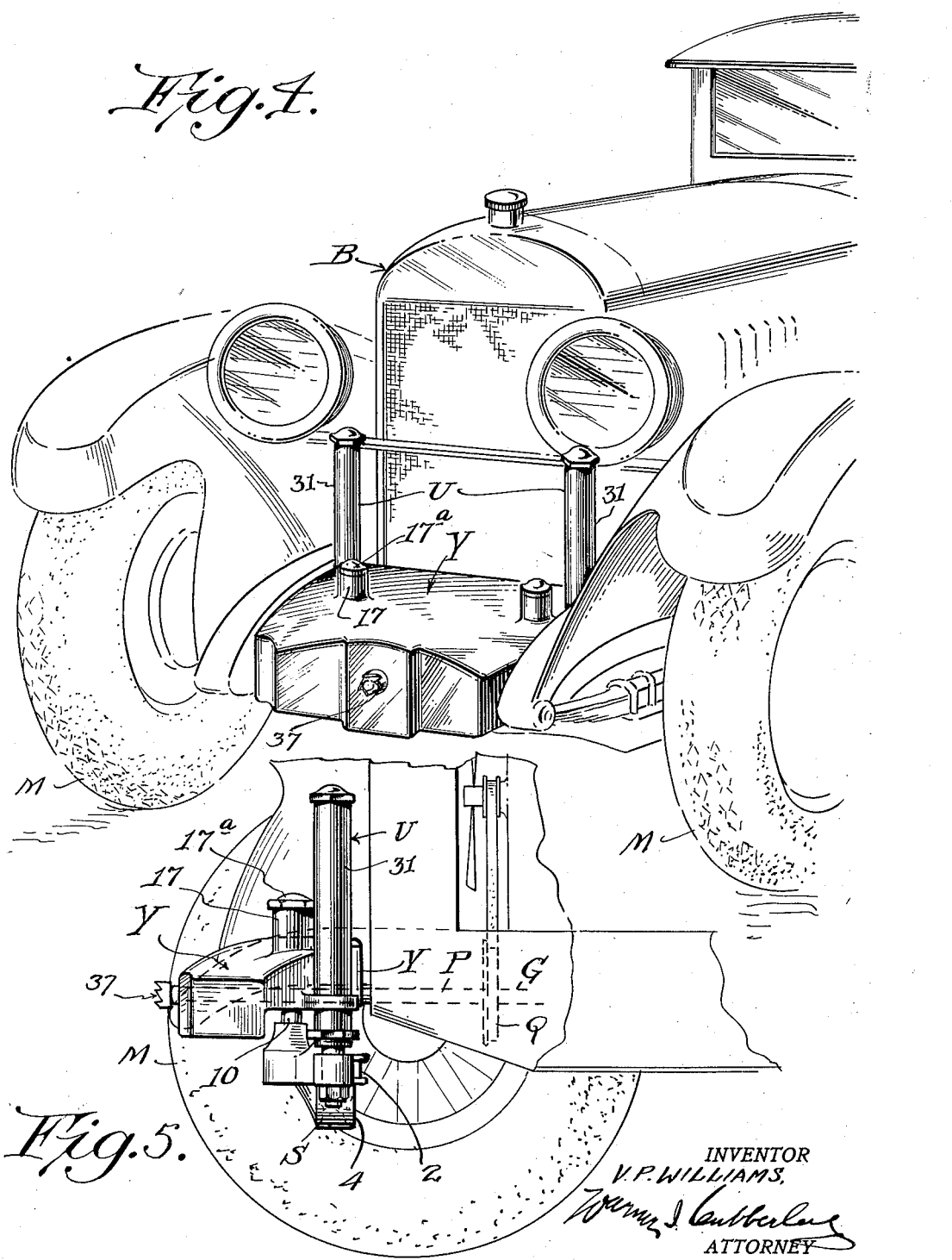

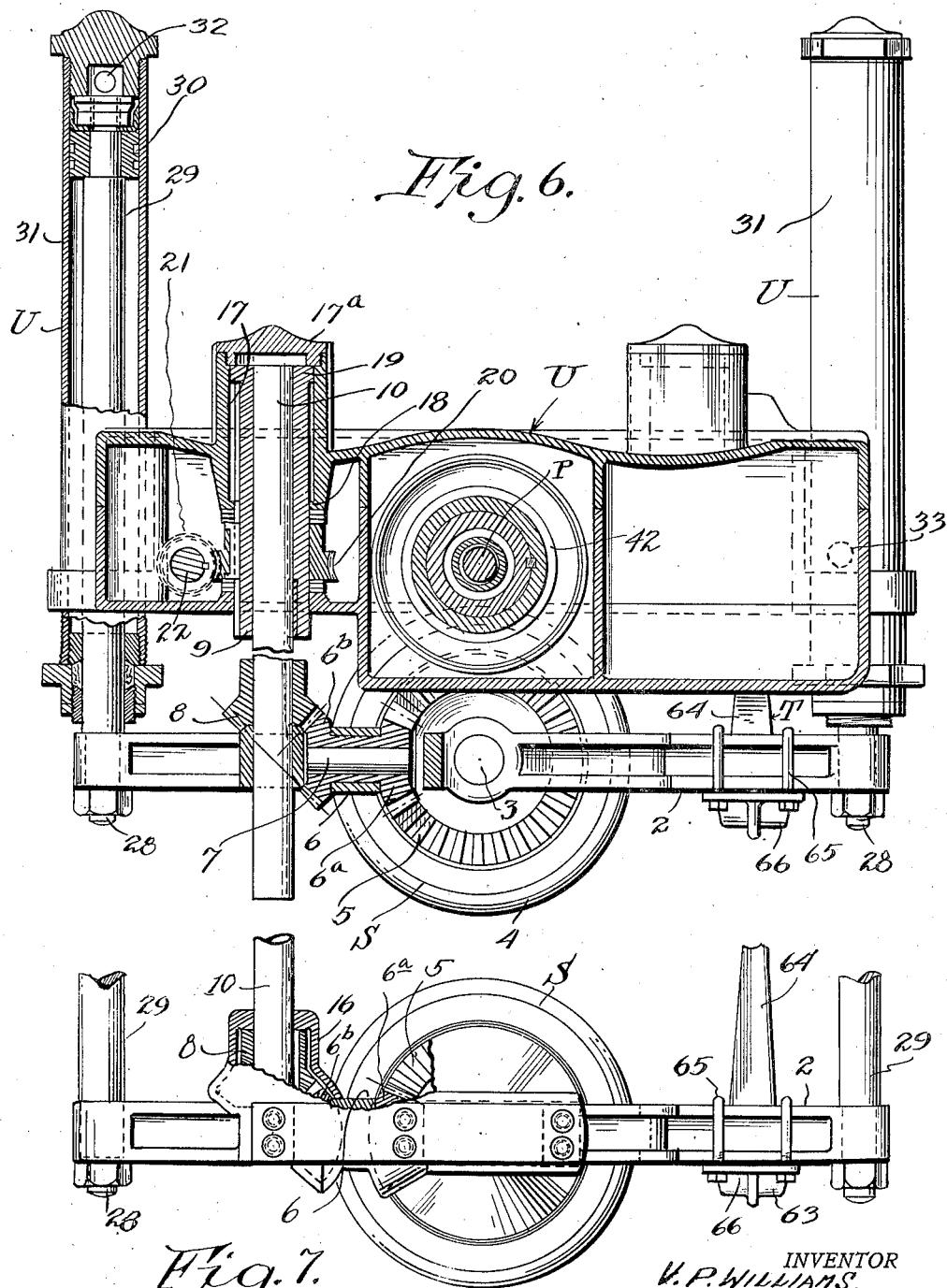

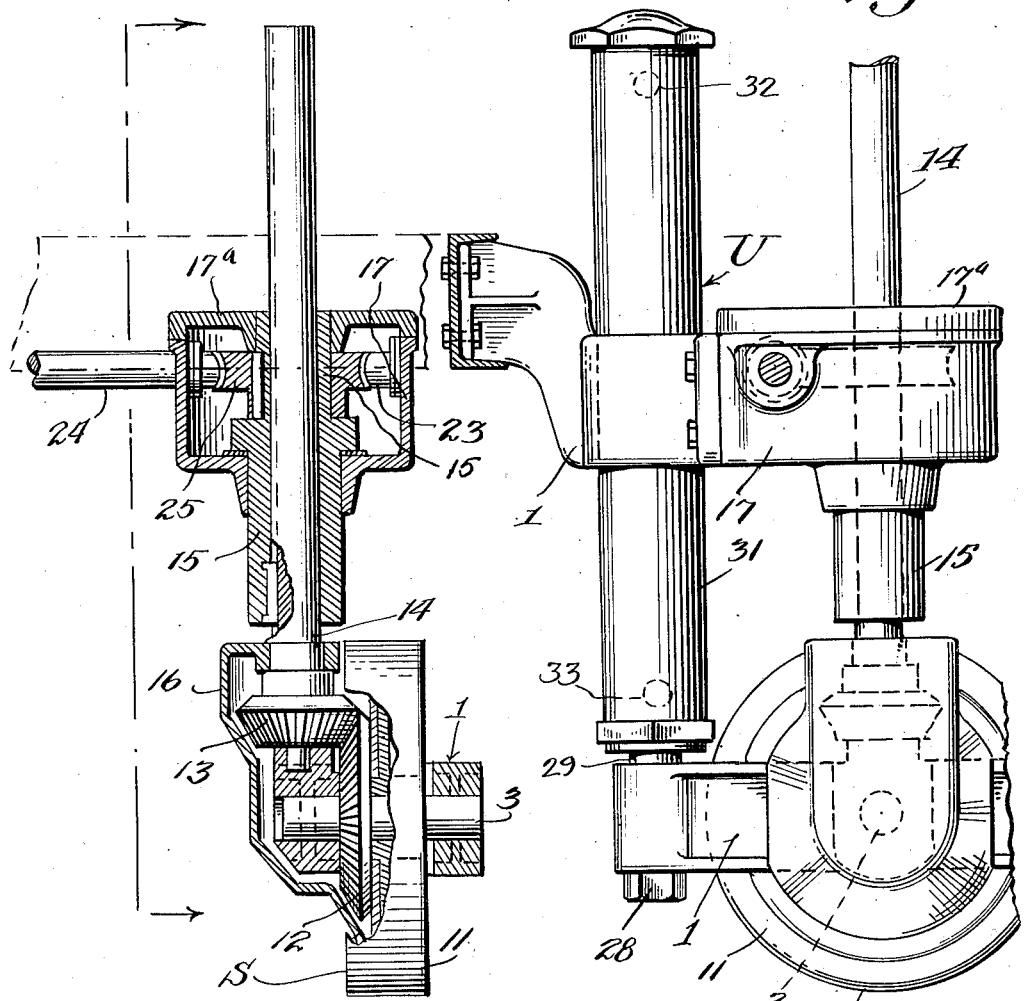
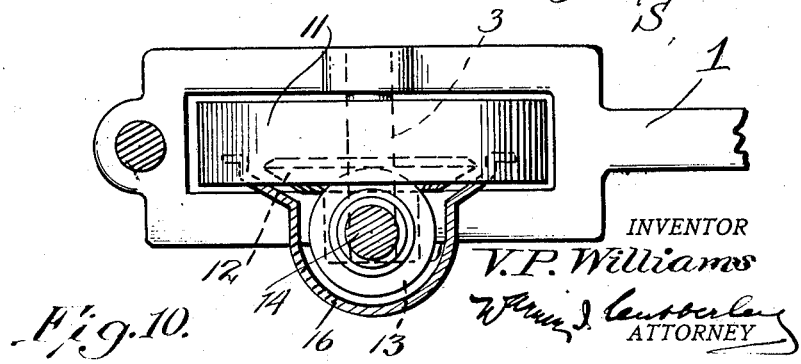

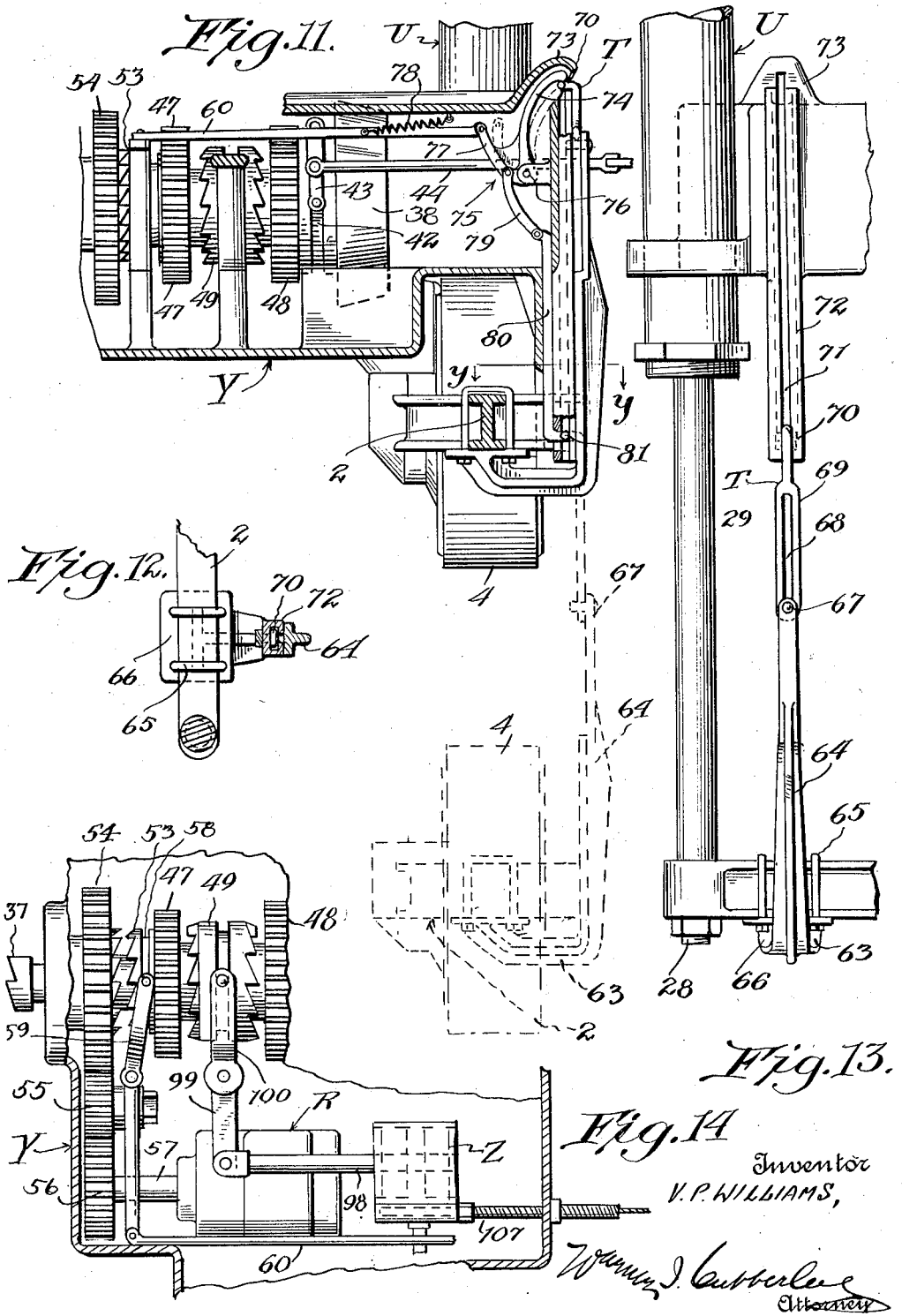

Feb. 1, 1927. 1,615,861
V. P. WILLIAMS
COMBINED MECHANICAL AND FLUID PRESSURE VEHICLE PARKING DEVICE
Filed Feb. 6, 1926 11 Sheets-Sheet 10
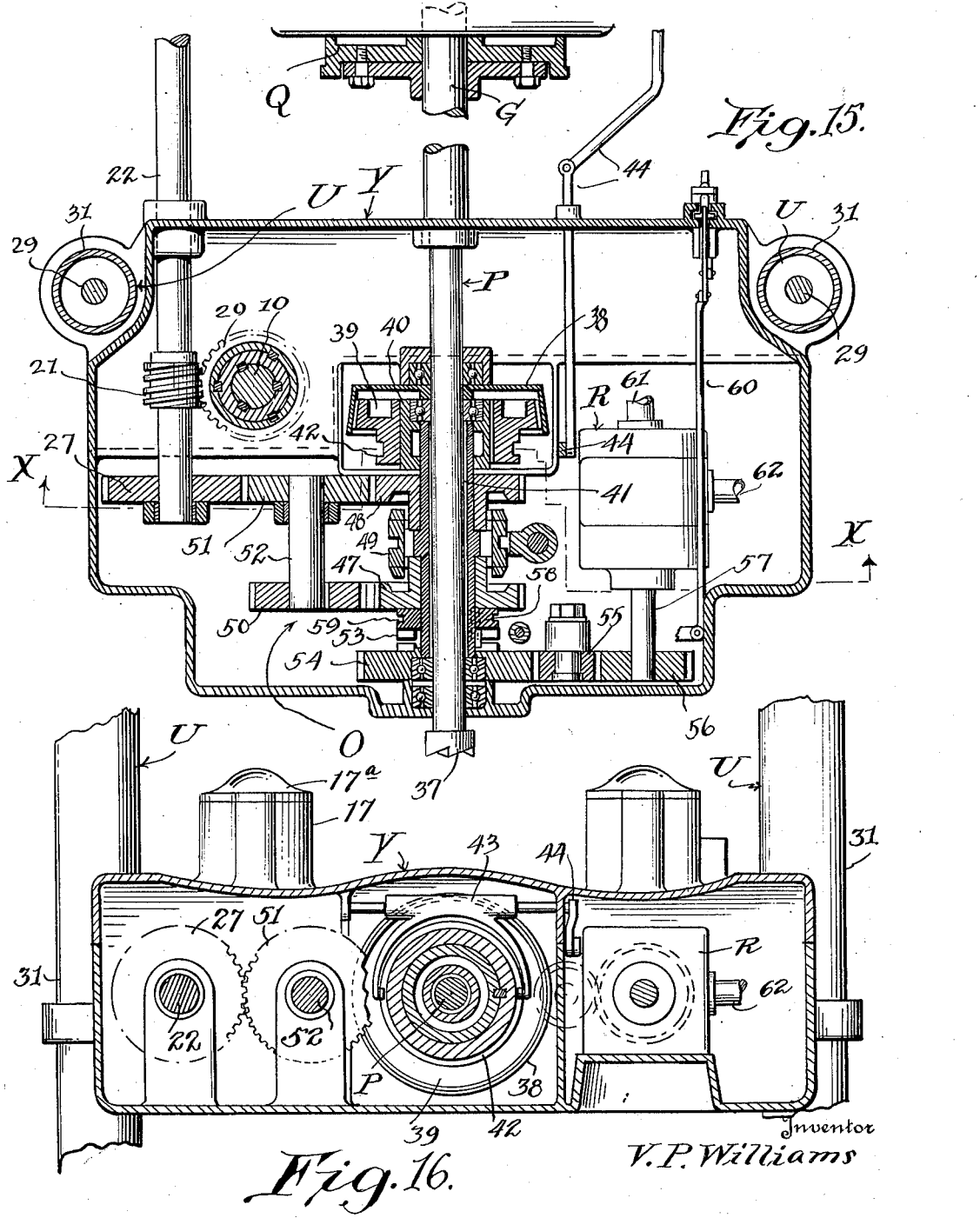
Fig. 15.
Fig. 16.
Inventor
V. P. Williams
Attorney

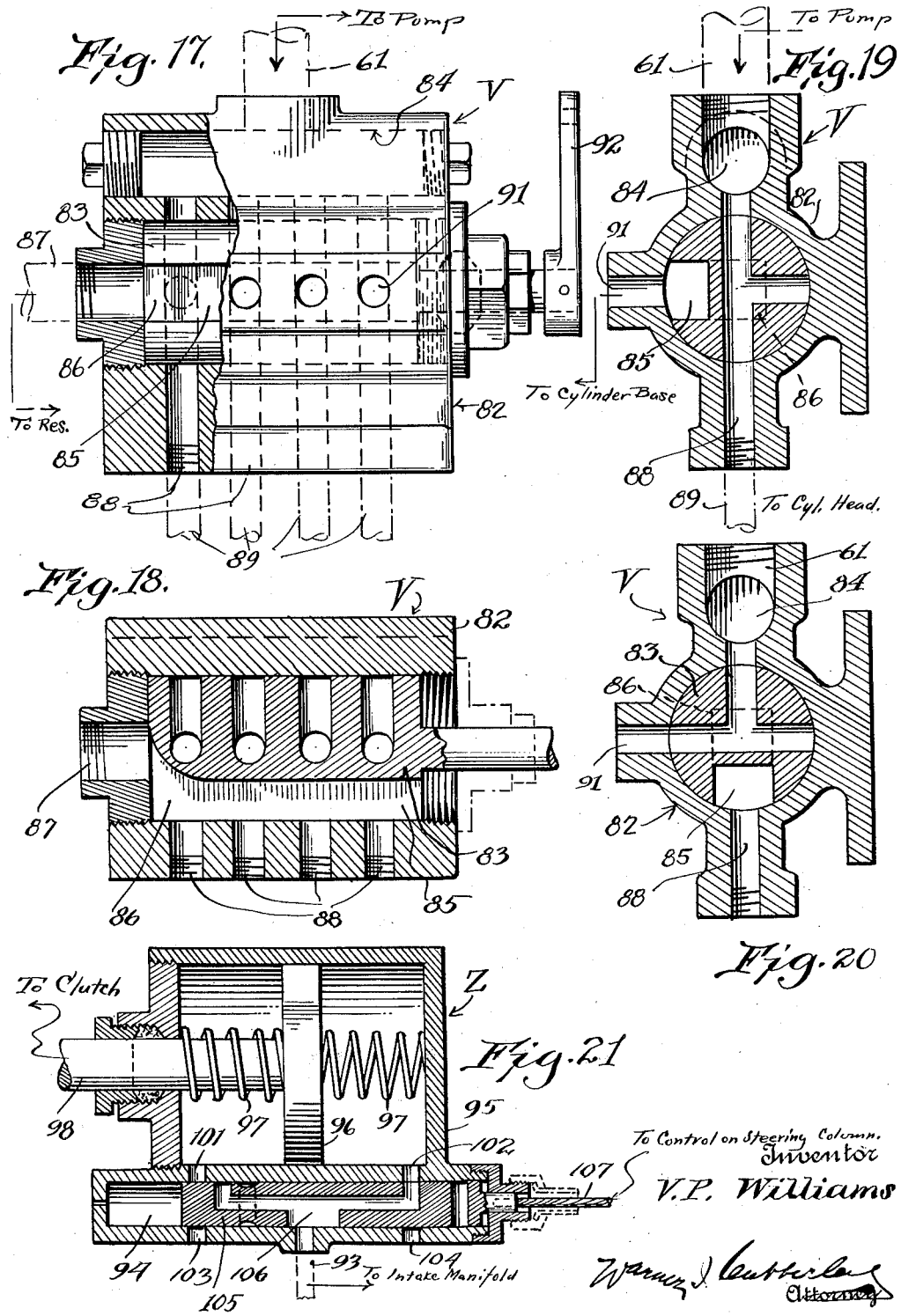

//patent number in upper right: 1,615,861
Patent date: Patented Feb. 1, 1927.

UNITED STATES PATENT OFFICE.

VILLOR P. WILLIAMS, OF BALTIMORE, MARYLAND, ASSIGNOR TO MIRIAM S. F. WILLIAMS, OF BALTIMORE, MARYLAND.

COMBINED MECHANICAL AND FLUID PRESSURE VEHICLE PARKING DEVICE.

Application filed February 6, 1926. Serial No. 86,574.

My present invention has reference, in its broad aspect, to improvements in means for bodily raising and laterally moving a vehicle, or other power driven body, whereby the same may be jacked up in its entirety on an even horizontal axis, and thence transported in a lateral direction by mechanism appurtenant to and cooperating with the power plant assembly to positions and along paths of travel not contemplated by the usual traction mechanism. More especially it is my purpose to provide a simplified, compact and efficient device which may be used and applied as an accessory to a modern motor vehicle and which is adapted for use in facilitating the parking of a motor vehicle under congested traffic conditions, and to this end I provide supplementary traction means, the supporting elements of which have a three-point contact with the road-bed thereby to properly support a vehicle in a raised position with a minimum of structure, and thence to transport the same laterally to the desired location. Furthermore, in my present apparatus compact gear and clutch transmission devices are provided which are directly empowered from an extension of the usual crank shaft of a motor vehicle whereby the various operations to which my mechanism is adapted are selectively attained by simple gear and clutch controls. My apparatus includes a wholly mechanical unit for empowering the traversing mechanism directly from the crank shaft of a vehicle, and another unit depending essentially upon fluid pressure for raising and lowering the vehicle preparatory to traversing the same or moving it laterally. The fluid pressure raising and lowering unit is empowered from a pump device coupled, upon occasion, with the crank shaft of a vehicle through my novel transmission, and unique means are provided in conjunction with my supplementary traction devices for preventing interruption of operative connections of the traversing unit because of changes of position in the traction devices during the raising and lowering operation. Furthermore, I have provided novel automatic clutch control means for regulating the operation of the pump of my fluid pressure vehicle raising and lowering apparatus; and by means of a by-pass from the intake manifold of the power plant of the vehicle I am enabled to actuate the clutch control of the vehicle traversing apparatus by the simple manipulation of a valve. Suitable means are also provided for supporting the conventional running gear of a vehicle during the jacking and traversing operations to prevent the same from sagging down and the like; and by means of a novel clutch I am enabled to disconnect the traversing mechanism of the forward supplementary traction devices whereby to cause a vehicle to be moved in an arcuate or circular path with said front supplementary traction device as a pivot.

Other and equally important objects and advantages of my invention may be briefly defined as follows;—first, I utilize the weight of the supplementary traction devices and the weight of the vehicle itself to respectively start the traction devices in their downward path of travel, and the vehicle in a downward path of travel in the raising and lowering operations respectively, thereby causing the automatic operation of pump clutch trip devices for connecting or disconnecting the pump with the crank shaft of a motor vehicle; second, my pump or fluid pressure control valve is so formed that when fluid is being pumped to the heads of my jacking cylinders, fluid in the bases thereof has a free system for return to the reservoir; third, my pump or fluid pressure control valve is so formed that all circulation of fluid in the system may be stopped to form a brake to prevent an automatic operation of the jacking means by a gravity operation of the supplemental wheels of the jacking means; fourth, my transmission devices are initially placed in an operative relation with the crank shaft of a motor vehicle by a single foot pedal; fifth, in operating the clutch controls and gear shift devices of my traversing or lateral propulsion apparatus a piston and cylinder assembly is utilized for causing the operation of the same through the instrumentality of suction induced by the intake manifold of the vehicle power plant, and; sixth, such cylinder and piston assembly is automatically returned to a neutral position upon placing the control valve therefore in a neutral position.

The particular elements of my apparatus employed to accomplish the above and other equally important objects will be hereinafter more fully described in detail and pointed out in the claims appended hereunto and forming a part of this specification.

In the accompanying drawings wherein is illustrated the preferred embodiment of my invention;—

Figures 1ª and 1ᵇ together represent a top plan view of a vehicle equipped with my apparatus, Figures 2ª and 2ᵇ together represent a side elevation of a vehicle equipped with my apparatus, Figure 3 is a front view partly in section of the front supplementary traction device, the lowered position of the same being shown in dotted lines, Figure 4 is a perspective view of the front of a vehicle showing the position and compactness of my pump and transmission assemblies, Figure 5 is a side view of the front portion of a vehicle showing the front jacking and traversing devices, Figure 6 is a detail view of the front jacking and traversing assembly in a raised position, Figure 7 is a detail view of the front jacking and traversing assembly in a lowered position, Figure 8 is a detail view of my rear jacking and traversing assembly, Figure 9 is a sectional view of the rear jacking and traversing assembly, Figure 10 is a transverse section of the rear jacking and traversing assembly, Figure 11 is a detail view of my transmission and automatic pump trip, Figure 12 is a view taken on line y—y of Figure 11, Figure 13 is a side elevation of the automatic pump trip in extended position, Figure 14 is a detail view of the pump clutch and drive, Figure 15 is a sectional transverse view of my transmission and clutch assembly, Figure 16 is a view taken on the line x—x of Figure 15, Figure 17 is a sectional side elevation of my pump control valve, Figure 18 is a sectional top plan of my pump control valve, Figure 19 is a transverse section of the valve in position to pump to the tops of the cylinders to raise or jack up a vehicle, Figure 20 is a transverse section of my valve in position to pump to the bottoms of the cylinders to lower a vehicle, Figure 21 is a sectional side elevation of my piston control unit for the traversing clutch mechanism, and Figure 22 is a detail view of a clutch for disconnecting the front supplementary traction devices to cause a vehicle to turn in an arcuate or circular path.

In the drawings wherein like characters of reference are used to designate like or similar parts throughout the several views;—

(A) designates the body of a conventional type of motor vehicle, (B) the radiator, (C) the steering wheel and column, (D) the instrument board, (E) the power plant, (F) the intake manifold of the power plant, and (G) the crank shaft. The front and rear axles of the vehicle are designated by (K) and (L) respectively and the front and rear wheels by (M) and (N) respectively. The foregoing parts are common to almost all types of motor vehicles and form no part of my present invention.

In order to correlate the various elements of my device to the end that its detailed construction may be readily understood, it may be broadly described as comprising multiple clutch and gear transmission mechanism (O) associated with an extension (P) of the usual vehicle crank shaft (G)—the lower fan belt pulley being shown at (Q), and from which a pump unit (R) and supplementary traction devices (S) are actuated upon occasion. The pump unit (R) is designed for automatic control through link and lever automatic clutch trip unit (T) affected by the extent of upward or downward movement of the supplementary traction devices (S), and the cylinder and piston assemblies (U), of which there are four (two for the front supplementary traction devices, and two for the rear supplementary traction devices), operate through the instrumentality of the pump to raise and lower the vehicle depending upon the location of the ports of a control valve (V) arranged on the instrument board (D) of the vehicle and interpolated in a system of fluid circulation from the pump to the cylinders. My present parking mechanism contemplates the utilization of three supplementary traction wheels, one in front and two in the rear of a vehicle, so that when such traction devices are active the vehicle as a whole is supported on three points thereby enabling me to attain pivotal or arcuate or circular movement of the vehicle through the instrumentality of a clutch device (W) shown in Figure 22. Furthermore, when in a raised position the usual running gear of the vehicle comprising axles (K) and (L) and wheels (M) and (N) are prevented from sagging by means of automatically manipulated hooks (X). My entire transmission and pump unit assembly is arranged in a compact, dust proof casing (Y) disposed in advance of the radiator (B) of the vehicle, and in order to reduce the number of parts of my apparatus to a minimum, I have provided a piston and vacuum cylinder assembly (Z) in conjunction with the intake manifold and controllable by a suitable slide valve for shifting the clutch element adapted to control the direction of movement of the traversing apparatus.

Traction devices.

Arranged rearwardly of the rear axle and wheels (L) and (N), and forwardly of the front axle and wheels (K) and (M), are frames (1) and (2) respectively. The front frame (2) has journalled therein the axle (3) of a front supplementary traction wheel (4). Said wheel (4) has fixed thereto a beveled gear (5) which is engaged by one gear element (6ª) of a double beveled gear unit (6) rotating on a stub shaft (7) carried by the frame. The other gear element (6ᵇ) engages with a beveled gear (8) integral with a sleeve (9) splined for sliding movement only on a shaft (10). The shaft (10) is designed to move upwardly and downwardly through an opening provided in the frame in the manner hereinafter described.

The rear frame (1) also has journalled therein the axles (3) of rear traction wheels (11)—two in number—which are spaced to positions adjacent each of the usual wheels (N) of a vehicle. One of the traction wheels (11) carries a beveled gear element (12) which engages a beveled gear (13) on the shaft (14). The shaft (14) in turn is splined for sliding movement only with respect to the sleeve (15).

The gear elements hereinbefore described are enclosed in a dust-proof housing (16).

Supplementary traction wheel drive mechanism.

As has heretofore been suggested the shafts (10) and (14) telescope within the respective sleeves (9) and (15) to which they are splined for sliding movement only. They, furthermore, are each mounted in housings (17) each of which is provided with a cap (17ª).

The housing (17) carrying the shaft (10) and sleeve (9) of the front supplementary traction wheel (4) is provided with an interior annular flange (18) adapted for engagement with an exterior annular flange (19) on the sleeve (9) so that downward movement of the sleeve is positively limited. The sleeve (9) has splined thereto a worm gear (20) which is engaged by a second worm gear (21) mounted on a shaft (22), so that upon rotation of the shaft (22)—hereinafter described—the sleeve (9) and shaft (10), gears (8) and (6) and wheel (4) will be actuated.

The housing (17) carrying the sleeve (15) of the rear traction wheels (11) has arranged therein a worm gear (23) which is mounted on a shaft (24), and which engages a worm (25) keyed to the sleeve (15). The sleeve (15) has no sliding movement but is simply journalled for rotation in the housing. The shaft (14) however passes directly through the sleeve (15) from end to end and is splined thereto so that upon rotation of the shaft (24), intermeshing worms (23) and (25), sleeve (15), shaft (14) and beveled gears (13) and (12), and the wheel (11) are actuated.

The shafts (22) and (24) are coupled together by a plurality of universal connections (26) and form what will hereinafter be designated as the traversing mechanism drive shaft (J), and to the forward end of the shaft (22) is fixed a gear (27) which is the driven gear for actuating the traversing mechanism drive shaft (J) in the manner which will be hereinafter described.

Jacking mechanism.

Bolted as at (28) to each of the outer ends of each of the frames (1) and (2) are vertical shafts (29) which carry on their upper ends pistons (30) operating in cylinders (31) cast into the casing (U) of my apparatus. The cylinders in turn are each provided with upper and lower ports (32) and (33) respectively communicating through pipes (34) and (35) respectively with a fluid reservoir (36), the valve (V) being arranged in the system. By suitable pump mechanism hereinafter described, fluid is forced either to the tops or the bottoms of the cylinders causing the pistons (30) to move up or down to actuate the shafts (29) whereby the frames and traction devices are caused to move either up or down without consequent interruption to the operative driving connections for said traction devices. The shafts (10) and (14) and sleeves (9) and (15) being adapted for relative sliding movement.

Transmission mechanism transmission clutch.

The crank shaft (G) of a vehicle (bearing the lower fan belt pulley (Q) is extended and reduced as at (P)—the crank dog being shown on the forward end thereof at (37). Fixed to the shaft (P) is one element (38) of a clutch; the other element (39) being slidable upon a member (40) fixed on a sleeve (41) loosely mounted on the shaft (P). The clutch element (39) has a recessed flange (42) engaged by a yoke (43); and the yoke (43) is connected by lever and rod devices (44) to an extra foot pedal (45), so that the foot pedal may be moved upon occasion to throw the clutch elements (38) and (39) into engagement to couple the sleeve (41) for rotation with the shaft (P). A suitable retractile spring (46) is supplied to hold the clutch elements normally disengaged.

Traversing drive clutch.

Loosely carried on the sleeve (41) are a pair of gears (47) and (48) between which is a clutch device (49) splined to the sleeve (41) and adapted to be moved to couple either the gear (47) or the gear (48) with the sleeve. The gears (47) and (48) are respectively in mesh at all times with gears (50) and (51) fixed to shaft (52), and the gear (51) is at all times in mesh with the gear (27) on shaft (22) of traversing mechanism drive shaft (J). Manifestly then, the gear (27) may be coupled with the shaft (P) to rotate either in a clockwise or a counter-clockwise direction by simply moving the clutch (49) to engage either gear (48) or (47)—the clutch elements (38) and (39) of course being in engagement to transmit power from the shaft (P).

Jacking or pump drive clutch.

Splined to the sleeve (41) forwardly of the gear (47) is a clutch device (53) which is adapted to be moved to couple a gear (54) for rotation with the sleeve (41), and gear (54) is at all times in mesh with an idler gear (55) which in turn is at all times in mesh with a driven gear (56) on a shaft (57) coupled with a pump device (R). The clutch (53) has a grooved flange (58) engaged by a yoke (59). Suitable rod and link elements (60) couple the yoke (59) with the link and lever automatic pump clutch trip unit (T) which functions—as will hereinafter be described—to throw the clutch out when a jacking or raising and lowering operation has been completed.

The pump device (R) is in a system of fluid circulation with the reservoir (36) through pipes (61) and (62), the valve unit (V) also being interposed in the system.

Automatic pump clutch trip unit.

Attached as at (63) to the front frame (2) is a vertical standard (64), such attaching means comprising straps (65) bolted to the bent end (66) of the standard. Said standard (64) at its upper end carries a pin (67) which engages in a slot (68) formed in the link (69). The link (69) has its upper end formed with a laterally extending T-head (70) which engages in a T-slot (71) provided in the member (72) formed on the casing (U). The upper end of the slot (71) terminates in a pocket (73) in which extends one leg (74) of a bell crank lever (75) which is pivoted as at (76) to the casing and has its other leg (77) engaged with the operating rod (60) of the clutch (53). A spring (78) tends to pull the rod rearwardly to normally engage the clutch. Also engaging the leg (77) to form a turning couple is a link (79) extending from a slidable rod (80) having a lateral T-head (81) also arranged in the T-slot of the member (72) but at the lower end thereof. By reason of the sliding connections (64), (68) and (72) the unit (T) will extend or contract with the downward or upward movement of the frame (2), and at the termination of either the upward or downward movement the bell crank lever (75) will be thrown to move the rod (60) to disengage the clutch (53) from the gear (54) thereby to disconnect the pump (R) from the power unit.

Valve unit and system of fluid circulation.

Arranged on the instrument board (D) of the vehicle is a multiple port valve unit (V) which is formed with a multiple port casing (82) and a multiple port valve (83). The casing has a chamber (84) communicating at all times by the pipe (61) with the pump (R). The valve (83) has a slot (85) therein having an enlarged end (86) which at all times registers with the pipe (87) to the reservoir. To the ports (32) in the tops or heads of each of the cylinders (31), and from the four ports (88) of the valve casing extend pipes (89), and to the ports (33) in the bottom or bases of the cylinders extend pipes (90) which are tapped into ports (91) in the valve casing. The valve (83) has four channels corresponding to the ports (88) and (91) so that when the same is turned by the operating handle (92) (on the instrument board D) the valve is thrown to open communication either from the tops or heads of the cylinders, through the pump, to the reservoir; or from the bottoms or bases of the cylinders through the pump, to the reservoir; and at the same time since slot (85) at all times registers with the pipe (87) to the reservoir and with either of the sets of ports, fluid is allowed to escape from the bottoms (or tops) of the cylinders while pressure is generated in the tops (or bottoms) of the cylinders. The neutral position of the valve traps the fluid and permits no flow in any direction thereby preventing any movement of the pistons (30) in the cylinders.

Operation of jacking or vehicle raising and lowering mechanism.

Assuming that it is desired to jack up a vehicle; the clutch elements (38) and (39) are moved to engagement by pedal (45) thereby coupling the sleeve (41) with the crank shaft (P)—the power plant of the vehicle being in motion—the valve (V) is then thrown from neutral to permit circulation of fluid from the tops or heads of the cylinders to the reservoir through the pump (R). The fluid no longer being trapped, the weight of the traction mechanism causes the same to move downwardly a length equal to the length of the lost-motion slot (68) thereby actuating the link and lever automatic trip unit (T) to release the bell crank lever arm (74) to the end that the spring (78) will move the clutch (53) to couple the gear (54) with the shaft (P). The pump is thus actuated and fluid is positively pumped to the heads or tops of the cylinders thus forcing the pistons (31) down and moving the shafts (29) and traction devices (4) and (11) downwardly to raise the vehicle. When the limit of downward movement is reached, and this is indicated by the limit of expansion of the link and lever automatic trip (T), the link (79) is pulled to withdraw the clutch (53) from engagement with gear (54) thereby to uncouple the pump from the shaft (P). The valve (V) is then thrown to neutral manually by the operator of the automobile choking the system of fluid circulation to maintain the vehicle in a raised position.

To lower the vehicle the valve is moved to permit circulation of fluid from the bottoms or bases of the cylinders, through the pump to the reservoir, and due to the weight of the vehicle it is caused to move downwardly a distance equal to the length of the lost-motion slot (68) so that the wheels of the vehicle rest on the ground thereby to again actuate the trip unit (T) as the ordinary wheels of the vehicle touch the ground to throw the clutch (53) to empower the pump (R) with the result that the shafts (29) are forced upwardly and the auxiliary traction elements raised to an out-of-the-way position.

*Vacuum controlled traversing clutch control.*

Tapped into the intake manifold (F) is a pipe (93) which communicates with a chamber (94) on the cylinder (95) in which is arranged a piston (96), hereinbefore defined as piston and vacuum cylinder unit (Z). The piston (96) is spring compensated as at (97) and has a shaft (98) extending to link connections (9) engaging the yoke (100) of the clutch (49). The chamber (94) communicates by two ports (101) and (102) with the opposite ends of cylinder (95) and with the atmosphere through ports (103) and (104). In the chamber is arranged a slide valve (105) having ports (106) for controlling the admission of fluid to either end of the cylinder or from both ends of the cylinder to the atmosphere. The position of the valve (105) is controlled by a flexible connection (107) which is connected with a lever (108) on the steering column (C).

*Operation of traversing gear shift.*

The vehicle having been jacked up after the manner hereinbefore described; the valve (105) is moved to permit the suction from the intake manifold (F) to move the piston (96) to engage the clutch (49) with one or the other of the gears (47) and (48) depending upon whether it is desired to move the vehicle into or out from a curbing. The power impulse is therefore carried from shaft (P) through clutch elements (38) and (39), through sleeve (41), clutch (49), gear (47)—(or 48)—traversing mechanism drive shaft (J) to the traction members. When in the neutral position the cylinder (95) discharges to the atmosphere, and the compensating springs (97) move the piston (96)—and consequently the clutch (49)—to the neutral position.

*Supporting devices for vehicle running gear.*

Since when a vehicle is jacked up the conventional running gear is inclined to sag, I have provided a plurality of hooks (X) which are pivoted as at (109) to the chassis stringers. The hooks for the rear running gear each have a finger (110) to which is attached a rod (111) which are engaged by the frame (1) to retract the hooks when the supplementary traction devices are raised. When they are lowered the hooks fall to a position to engage beneath the axle (L) by force of gravity. Each of the hooks for the front running gear has a finger (112) which is adapted to be engaged by a pin (113) on the frame (2) to withdraw the hooks when the supplementary traction devices are in raised position, but to release the hooks when such traction devices are lowered thereby to allow them to fall by force of gravity to engage the running gear (K) to support the same.

*Pivoting mechanism and its operation.*

In Figure 22 is shown my device for causing a vehicle to be pivoted upon the front supplementary traction wheel (4), the rear traction wheel (11) being driven to cause circular or arcuate movement of the vehicle. My means comprises the interpolation of a clutch (114) on the shaft (7) between the gears (6$^a$) and (6$^b$), said clutch being operated by suction induced in a piston and cylinder assembly (115) to be moved to uncouple the gears (6$^a$) and (6$^b$) so that no power will be transmitted to the wheel (4). Suction may be created by tapping into the line (93) to the intake manifold. Thus by throwing out the clutch (114) and thereby driving the rear traction wheel (11) only the vehicle will be caused to pivot on the front wheel (4) and turn in a circular path.

The operation of my apparatus and its construction is believed to be apparent from the foregoing, but attention is especially invited to its simplicity, compactness, and to the fact that in operation it is practically fool proof, means being employed to dispense as much as possible with the human factor in controlling the operation of its parts.

While in the foregoing there has been illustrated in the drawings and described in the specification such combination and arrangement of elements as constitute the preferred embodiments of my invention, it is nevertheless desired to emphasize the fact that interpretation of my invention should only be conclusive when made in the light of the subjoined claims.

I claim:—

1. Jacking and traversing mechanism for motor vehicles comprising a plurality of traction devices supplementary to those of the vehicle and designed to support the same substantially horizontally as a whole, fluid pressure operated means for raising and lowering the vehicle on the supplementary traction devices, mechanical means for actuating the traction devices to move the vehicle laterally when in a raised position, and a supplementary transmission unit associated with the crank shaft of the vehicle and with the fluid pressure operated jacking means and with the mechanical lateral propulsion means for actuating and controlling the operation of the same.

2. Jacking and traversing apparatus for motor vehicles comprising a plurality of traction devices supplementary to those of the vehicle and designed to support the same substantially horizontally as a whole, means arranged in a closed system of fluid distribution for raising and lowering the vehicle on the supplementary traction devices, means for generating pressure in said system, means automatically regulated by the movement of the vehicle raising and lowering means for controlling the operating of the means for generating pressure in said system, a supplementary transmission unit associated with a driving element of the vehicle and operatively connected with the pressure generating means, and means operatively associated with the transmission means and with the traction devices for actuating the same to move the vehicle laterally.

3. Jacking and traversing apparatus for motor vehicles comprising a plurality of traction means supplementary to those of the vehicle and designed to support the same substantially horizontally as a whole, means arranged in a closed system of fluid distribution for raising and lowering the vehicle, means for generating pressure in said system, mechanical devices operatively associated with the traction devices for actuating the same to move a vehicle laterally, and supplementary transmission means associated with the pressure generating means and with the mechanical operating means and with a driving element of a vehicle and shiftable to empower either the pressure generating means or the mechanical operating means from the driving element of the vehicle.

4. Jacking and traversing apparatus for motor vehicles comprising a plurality of traction devices supplementary to those of the vehicle and designed to support the same substantially horizontally as a whole, a closed system of fluid distribution, means for generating pressure in said system, means arranged in said system for raising and lowering the vehicle, supplementary transmission means operatively connected with a driving element of a vehicle and with said pressure generating means, mechanical means operatively connected with the transmission means and with said traction devices whereby to actuate the same to move the vehicle laterally, a valve device arranged in the closed system of fluid distribution for regulating the flow of fluid therein, and pressure controlled means associated with the transmission means for regulating the operation of the mechanical lateral propulsion mechanism.

5. Jacking and traversing mechanism for motor vehicles comprising a plurality of traction devices supplementary to those of the vehicle and designed to support the same substantially horizontally as a whole, transmission mechanism associated with a driving element of the vehicle power plant, means for bodily raising and lowering the vehicle operatively connected with the transmission means and the traction devices, means for laterally moving a vehicle operatively connected with the transmission means and the traction devices, and pressure controlled means in conjunction with the transmission means for regulating the operation of the means for laterally moving a vehicle.

6. Jacking and traversing apparatus for motor vehicles comprising a plurality of traction devices supplementary to those of the vehicle and designed to support the same substantially horizontally as a whole, transmission mechanism associated with a driving element of the vehicle power plant, means for bodily raising and lowering the vehicle operatively connected with the transmission means and the traction devices, means for laterally moving a vehicle operatively associated with the transmission means and the traction devices, and automatically operated means associated with the transmission means and operatively connected with the traction devices whereby to control the operation of the vehicle raising and lowering means.

7. Jacking and traversing apparatus for motor vehicles comprising a plurality of traction devices supplementary to those of the vehicle and designed to support the same substantially horizontally as a whole, transmission mechanism associated with a driving element of the vehicle power plant, means for bodily raising and lowering the vehicle operatively connected with the transmission means and the traction devices, means for laterally moving a vehicle operatively associated with the transmission means and the traction devices, and an extensible trip device operatively associated with the transmission means and with the traction devices whereby the means for bodily raising and lowering a vehicle are disconnected from the transmission and rendered inactive at the termination of either the raising or lowering operation.

8. Jacking and traversing apparatus for motor vehicles comprising a plurality of traction devices supplementary to those of the vehicle and designed to elevate and support the same substantially horizontally as a whole, and gravity actuated hook devices for engaging the running gear of a vehicle when the same is raised and arranged to be operatively engaged when the traction devices are rendered passive and withdrawn above tread of the vehicle running gear whereby to release the same from said running gear for the purpose defined.

9. Jacking and traversing apparatus for motor vehicles comprising a plurality of vertically movable traction members supplementary to those of the vehicle and designed to elevate and support the vehicle substantially horizontally as a whole, a plurality of pivoted hooks adapted to swing freely by force of gravity to engage the conventional running gear of a vehicle when said vehicle is in a raised position, and said hooks provided with means for engaging the vertically movable traction members to move the same out of engagement with the conventional running gear of a vehicle when the vehicle is lowered with its wheels resting on their treads.

10. Jacking and traversing apparatus for motor vehicles comprising a plurality of traction devices supplementary to those of the vehicle and designed to support the same substantially horizontally as a whole, a system of fluid distribution including a reservoir and pump device, transmission mechanism for actuating the pump device to generate pressure in the system, means interpolated in the system for raising and lowering a vehicle upon the traction devices depending upon the direction of circulation in the system, and valve means also interpolated in the system of fluid circulation and movable to regulate the flow of fluid in the system, said valve means adapted when active to at all times establish circulation from said vehicle raising and lowering means to the reservoir, and when active to cut off all circulation of fluid either from the pump, reservoir or means for raising and lowering the vehicle.

11. Jacking and traversing apparatus for motor vehicles comprising a plurality of traction devices supplementary to those of the vehicle and designed to support the same substantially horizontally as a whole, a shaft carried by each traction device and arranged to actuate said traction device upon rotation of the shaft, a transmission unit associated operatively with a drive element of the power plant of the vehicle, and a sectional shaft, the respective sections of which are universally connected, extending from the transmission unit to the respective shafts of the traction devices and operatively connected with the same for the purpose defined.

12. Jacking and traversing apparatus for motor vehicles comprising a plurality of traction devices supplementary to those of the vehicle and designed to support the same, said traction devices arranged one in the front of the vehicle and two in the rear to provide a triangular supporting base, transmission mechanism associated with a driving element of the vehicle power plant, and operative connections between said transmission mechanism and the front traction device and with but one rear traction device whereby to actuate the same to move the vehicle laterally.

13. Jacking and traversing mechanism for motor vehicles comprising a plurality of traction devices supplementary to those of the vehicle and designed to support the same substantially horizontally as a whole, transmission mechanism associated with a driving element of the power plant of the vehicle, a shaft connected with each traction device, a piston on the shaft, a cylinder receiving each piston, a sleeve receiving each shaft for sliding movement only with respect thereto, means for generating pressure in the cylinder to operate the pistons to cause the shafts to move upwardly and downwardly, a gear unit carried by each shaft and operating upon each traction device, and operative gear and shaft connections from said gear unit and transmission device whereby to actuate said traction devices irrespective of their position induced by the axial movement of the shaft.

14. Jacking and traversing mechanism for motor vehicles comprising a plurality of traction devices supplementary to those of the vehicle and designed to support the same substantially horizontally as a whole, transmission mechanism associated with a driving element of the vehicle power plant, fluid pressure operated means for bodily raising and lowering the vehicle operatively connected with the transmission means and the traction devices, means having wholly mechanical elements operatively associated with the transmission means and traction devices for actuating the same to move the vehicle laterally, and clutch devices for disconnecting one of said traction devices while driving the other traction devices to cause the vehicle to assume pivotal movement about the idle traction device as a pivot.

In testimony whereof, I affix my signature hereunto.

VILLOR P. WILLIAMS.